CYCLOOLIGOMERIZATION OF 1,3-DIENES

Marvin A. McCall and Harry W. Coover, Jr., both of Kingsport, Tenn., assignors to Eastman Kodak Company, Rochester, N.Y., a corporation of New Jersey
No Drawing. Filed Apr. 5, 1965, Ser. No. 445,694
11 Claims. (Cl. 260—666)

This invention relates to a novel chemical process for the preparation of certain cyclic oligomers. More particularly, this invention relates to a novel catalytic process which is particularly useful for the preparation of cyclic dimers and cyclic trimers, e.g., 4-vinylcyclohexenes; 1,5-cyclooctadienes; and 1,5,9-cyclododecatrienes; from 1,3-dienes.

The preparation of such cyclic oligomers from 1,3-dienes has heretofore been accomplished by the thermal oligomerization of 1,3-dienes or by the use of certain catalysts, e.g., zerovalent nickel compounds or Ziegler catalysts such as aluminum alkyls, etc. Each of the known processes for the preparation of cyclic oligomers from 1,3-dienes has had one or more serious disadvantages which have limited the usefulness of such processes. Thermal cyclooligomerization, for example, is characterized by the preparation of the desired cyclic oligomers in low yields and low conversions. Cyclooligomerization processes employing zerovalent nickel catalysts are difficult to carry out because of the instability of the catalyst and therefore require special catalyst handling procedures. In addition, the reaction product from cyclooligomerization processes employing zerovalent nickel catalysts generally contains 1,3-cyclooctadiene, an undesirable cyclic oligomer.

Other catalysts that are used in cyclooligomerization processes, e.g., Ziegler catalysts, are usually unsatisfactory in that large amounts of linear oligomers are formed and the conversion and yield of the desired cyclic oligomers is therefore low.

We have now discovered a novel cyclooligomerization process in which 1,3-dienes are selectively converted to the desired cyclic oligomers, i.e., 4-vinylcyclohexenes; 1,5-cyclooctadienes; and 1,5,9-cyclododecatrienes, in high yields and high conversions while avoiding the catalyst handling problems inherent in certain of the known cyclooligomerization processes. Our process is, therefore, particularly suited to the large scale manufacture of such cyclic oligomers.

The process of our invention is based in part on our discovery that certain complexed divalent organo-nickel compounds catalyze the cyclooligomerization of 1,3-dienes to 4-vinylcyclohexenes; 1,5-cyclooctadienes; and 1,5,9-cyclododecatrienes. Most of the complexed divalent organo-nickel compounds which are used as catalysts in our cyclooligomerization process are stable compounds which do not require special handling procedures. In any event, all of the precursors for the complexed divalent organo-nickel catalysts are stable compounds and do not require special handling procedures. The catalysts employed in the process of our invention are complexed divalent organo-nickel compounds which can be represented by the formula:

(I)  $(R_3P)_2NiR_2$ in which each of the substituents R is a hydrocarbyl radical. The catalysts of the above Formula I can be prepared by reacting a Grignard reagent which a complexed nickel halide according to the equation:

(A)  $(R_3P)_2NiX_2 + 2MgRX \rightarrow (R_3P)NiR_2 + 2MgX_2$ or by reacting an alkali metal hydrocarbyl with a complexed nickel halide according to the equation:

(B)  $(R_3P)_2NiX_2 + 2RM \rightarrow (R_3P)_2NiR_2 + 2MX_2$

In the formulae in the above equations, each of the substituents R is a hydrocarbyl radical, each of the substituents X is halogen, and M is an alkali metal. The complexed nickel halide of the formula:

(II)  $(R_3P)_2NiX_2$ and the catalyst of the Formula I, above, can be prepared and isolated by the procedures described by Chatt et al. in J. Chem. Soc., 1718–29 (1960).

The hydrocarbyl radical R in the Formula I for the catalyst employed in the process of our invention preferably has 1 to about 10 carbon atoms. Examples of hydrocarbyl radicals represented by R include methyl, ethyl, propyl, isopropyl, butyl, isobutyl, sec-butyl, tert-butyl, pentyl, hexyl, 2-methylpentyl, heptyl, octyl, 2-ethylhexyl, nonyl, decyl, undecyl, dodecyl, phenyl, o-tolyl, m-tolyl, p-tolyl, xylyl, benzyl, ethenyl, 1-propenyl, 2-propenyl, 1-butenyl, 2-butenyl, 3-butenyl, isobutenyl, ethynyl, 1-propynyl, 2-propynyl, 1-butynyl, 2-butynyl, 3-butynyl, 2-phenylethynyl, etc.

The alkali metal, M, in the preceding formulae and equations is preferably lithium or sodium and the halogen represented by X is typically fluorine, chlorine, bromine or iodine.

The process of the invention can be carried out in a variety of ways. For example, the catalyst can be prepared, isolated, and added to a vessel containing the 1,3-diene or the catalyst can be prepared and the reaction solution containing the catalyst added to the vessel containing the 1,3-diene.

Another procedure is to form the catalyst in situ in the vessel containing the 1,3-diene. Thus, the complexed nickel halide can be added to a vessel containing a 1,3-diene and a Grignard reagent or an alkali metal hydrocarbyl, or the Grignard reagent or alkali metal hydrocarbyl can be introduced into a vessel containing a 1,3-diene and a complexed nickel halide.

The process of our invention can be carried out in a batch or continuous fashion. When the process is carried out continuously, the catalyst or a reaction solution containing the catalyst can be continuously introduced into the vessel in which the cyclooligomerization reaction takes place. Another procedure for continuously carrying out the process of the invention is to continuously form the catalyst in situ by separately adding the complexed nickel halide and Grignard reagent or alkali metal hydrocarbyl to the vessel in which the cyclooligomerization of the 1,3-diene takes place. Either of the reagents which react to form the catalyst in situ can be introduced into the oligomerization reaction in the 1,3-diene as it is continuously added to the reactor.

The 1,3-dienes which are useful in the process of our inventions are those which have heretofore been employed in cyclooligomerization reactions. Examples of the useful 1,3-dienes include 1,3-butadiene; isoprene, i.e., 2-methyl-1,3-butadiene; piperylene, i.e., 1,3-pentadiene; chloroprene, i.e., 2-chloro-1,3-butadiene; 2,3-dichloro-1,3-butadiene; 2,3-dimethyl-1,3-butadiene; etc.

The process of our invention is preferably carried out at elevated temperatures. A particularly suitable temperature range is from about 20° C. to about 250° C.

Suitable pressures for carrying out the process of our invention vary from about atmospheric pressure or below to a pressure of several thousand pounds per square inch, e.g., 3000 p.s.i. or higher. In general, the reaction pressure increases as the reaction temperature increases and should be sufficiently high to keep the 1,3-diene in the liquid phase at the reaction temperature. If no solvent is employed, the reaction pressure should be equal to or ployed in the recation. If a solvent for the 1,3-diene is greater than the vapor pressure of the 1,3-diene ememployed in the process of the invention, the pressure should be equal to or greater than the vapor pressure of the solution containing the 1,3-diene.

The amount of catalyst employed in our process can be widely varied. In general, the amount of catalyst should be from about 0.5 to about 10 weight percent based on the 1,3-diene.

The following example illustrates the process of the invention.

EXAMPLE

The complexed nickel halide catalyst precursors of the formula $(R_3P)_2NiX_2$ were prepared by adding a hot ethanolic solution of a phosphine of the formula $R_3P$ to a hot ethanolic solution of the appropriate nickel halide. The complexed nickel halide crystallized from the reaction mixture on cooling and could be purified by recrystallization from an alcohol, e.g., butanol.

The complexed divalent organo-nickel catalyst was prepared by reacting the complexed nickel halide of the formula $(R_3P)_2NiX_2$ with a Grignard reagent of the formula $RMgX$ or with an alkali metal hydrocarbyl of the formula $RM$. The reaction mixture was hydrolyzed with a dilute halogen acid, e.g., HCl, and the catalyst, when isolated, was recovered from the organic layer.

A number of runs employing 1,3-butadiene, a preferred reactant, and a catalyst prepared according to the method described above were made. In some instances, the catalyst was isolated, and, in others, the reaction mixture containing the catalyst was added to the reaction vessel. For comparison, several runs employing no catalyst or employing a catalyst precursor were made.

The results of the various runs are summarized in the table, below:

COMPARISON RUNS

| No. | Catalyst Structure | Catalyst Isolated | Temp., °C. | Percent Conversion | Percent Yield 4-vinyl Cyclohexene | Percent Yield 1,5-cyclooctadiene | Percent Yield 1,5,9-cyclododecatriene |
|---|---|---|---|---|---|---|---|
| 1 | No Catalyst | | 180 | 37.0 | 80.5 | 3.2 | |
| 2 | $[(C_6H_5)_3P]_2NiCl_2$ | Yes | 130 | 5.5 | 89.9 | 3.8 | None |
| 3 | $[(C_6H_5)_3P]_2NiClC_4H_9$ | Yes | 130 | 12.6 | 91.0 | 3.8 | 1.2 |
| 4 | $[(C_4H_9)_3P]_2NiCl_2$ | Yes | 130 | 15 | 74.0 | 1.7 | 21.0 |

CATALYST RUNS

| No. | Catalyst Structure | Catalyst Isolated | Temp., °C. | Percent Conversion | 4-vinyl Cyclohexene | 1,5-cyclooctadiene | 1,5,9-cyclododecatriene |
|---|---|---|---|---|---|---|---|
| 5 | $[(C_6H_5)_3P]_2Ni(C_4H_9)_2$ | Yes | 130 | 54.0 | 23.8 | 51.9 | 23.3 |
| 6 | $[(C_6H_5)_3P]_2Ni(C_4H_9)_2$ | No | 130 | 80.5 | 24.4 | 65.0 | 8.4 |
| 7 | $[(C_6H_5)_3P]_2Ni(C_4H_9)_2$ | No | 160 | 84.0 | 22.2 | 67.4 | 9.9 |
| 8 | $[(C_4H_9)_3P]_2Ni(C_4H_9)_2$ | No | 130 | 86.0 | 32.8 | 59.5 | 7.8 |
| 9 | $[(C_2H_5)_3P]_2Ni(C_4H_9)_2$ | No | 130 | 89.2 | 36.5 | 59.0 | 4.1 |
| 10 | $[(C_2H_5)_3P]_2Ni(C_6H_5)_2$ | Yes | 240 | 35.0 | 44.9 | 43.5 | 3.85 |
| 11 | $[(C_2H_5)_3P]_2Ni(C_6H_5)_2$ | No | 100 | 40.2 | 25.7 | 46.3 | 16.9 |
| 12 | $[(C_6H_5)_3P]_2Ni(C_6H_4CH_3)_2$ | Yes | 180 | 65.0 | 92.0 | 4.2 | 0.4 |
| 13 | $[(C_6H_5)_3P]_2Ni(C_6H_5)_2$ | No | 130 | 82 | 30.3 | 60.3 | 8.95 |
| 14 | $[(C_6H_5)_3P]_2Ni(C_6H_5)_2$ | No | 60 | 10.5 | 28.6 | 26.9 | 3.63 |
| 15 | $[(C_6H_5)_3P]_2Ni(C_4H_9)_2$ | No | 25 | 8.25 | 58.2 | 35.2 | None |
| 16 | $[(C_6H_5CH_2)_3P]_2Ni(C_4H_9)_2$ | No | 130 | 85 | 30.1 | 60.2 | 6.4 |
| 17 | $[(C_6H_5CH_2)(C_6H_5)P]_2Ni(C_4H_9)_2$ | No | 130 | 80 | 28.6 | 66.0 | 4.0 |
| 18 | $[(C_6H_5CH_2)(C_6H_5)_2P]_2Ni(C_4H_9)_2$ | No | 130 | 75 | 22.6 | 66.5 | 9.9 |
| 19 | $[(CH_2=CH-CH_2)(C_6H_5)_2P]_2Ni(C_4H_9)_2$ | No | 130 | 65 | 36.5 | 60.0 | 3.1 |
| 20 | $[(C_6H_5)_3P]_2Ni(C\equiv CC_6H_5)_2$ | Yes | 130 | 80 | 24.2 | 65.3 | 8.5 |
| 21 | $[(C_2H_5)_3P]_2Ni(C\equiv CH)_2$ | Yes | 130 | 75 | 21.8 | 68.0 | 8.8 |
| 22 | $[(C_2H_5)_3P]_2Ni(C\equiv CCH_3)_2$ | Yes | 130 | 81.4 | 23.2 | 52.8 | 23.3 |
| 23 | $[(C_3H_7)_3P]_2Ni(C\equiv CC_6H_5)_2$ | Yes | 130 | 89.1 | 45.2 | 43.3 | 4.5 |
| 24 | $[(C_2H_5)_2(C_6H_5)P]_2Ni(2\text{-biphenylyl})_2$ | Yes | 130 | 30.0 | 79.5 | 3.5 | None |

Although the invention has been described in considerable detail with particular reference to certain preferred embodiments thereof, variations and modifications can be effected within the spirit and scope of the invention as described hereinbefore and as defined in the appended claims.

We claim:

1. In a process for preparing cyclic oligomers by contacting a 1,3-diene with a catalyst, the novel procedure which comprises employing as a catalyst in said process a complexed divalent organo-nickel compound of the formula:

$$(R_3P)_2NiR_2$$

wherein each of the substituents R is a hydrocarbyl group.

2. The process of claim 1 in which said catalyst is formed in situ by the reaction of a complexed divalent nickel halide of the formula:

$$(R_3P)_2NiX_2$$

with a compound having a formula selected from the group consisting of:

(a) RMgX and
(b) RM;

wherein each of the substituents R is a hydrocarbyl group, M is an alkali metal, and X is halogen.

3. In a process for preparing cyclic oligomers by contacting a 1,3-diene with a catalyst, the novel procedure which comprises employing as a catalyst in said process a complexed divalent organo-nickel compound of the formula:

$$(R_3P)_2NiR_2$$

wherein each of the substituents R is a hydrocarbyl group having 1 to about 10 carbon atoms.

4. The process of claim 3 in which said catalyst is formed in situ by the reaction of a complexed divalent nickel halide of the formula:

$$(R_3P)_2NiX_2$$

with a compound having a formula selected from the group consisting of:

(a) RMgX and
(b) RM;

wherein each of the substituents R is a hydrocarbyl group having 1 to about 10 carbon atoms; M is an alkali metal selected from the group consisting of:

(a) lithium and
(b) sodium;

and X is a halogen selected from the group consisting of:

(a) fluorine,
(b) chlorine,
(c) bromine, and
(d) iodine.

5. In a process for preparing cyclic oligomers by contacting 1,3-butadiene with a catalyst, the novel procedure which comprises employing as a catalyst in said process a complexed divalent organo-nickel compound of the formula:

$$(R_3P)_2NiR_2$$

wherein each of the substituents R is a hydrocarbyl group having 1 to about 10 carbon atoms.

6. The process of claim 5 in which the catalyst is formed in situ by the reaction of a complexed divalent nickel halide of the formula:

$$(R_3P)_2NiX_2$$

with a compound having the formula selected from the group consisting of:

(a) RMgX and
(b) RM;

wherein each of the substituents R is a hydrocarbyl group having 1 to about 10 carbon atoms; M is an alkali metal selected from the group consisting of:

(a) lithium and
(b) sodium;

and X is a halogen selected from the group consisting of:

(a) fluorine,
(b) chlorine,
(c) bromine, and
(d) iodine.

7. In a process for preparing cyclic oligomers by contacting 1,3-butadiene with a catalyst, the novel procedure which comprises employing as a catalyst in said process a complexed divalent organo-nickel compound of the formula:

$$[(C_2H_5)_3P]_2Ni(C{\equiv}CH)_2$$

8. In a process for preparing cyclic oligomers by contacting 1,3-butadiene with a catalyst, the novel procedure which comprises employing as a catalyst in said process a complexed divalent organo-nickel compound of the formula:

$$[(C_6H_5)_3P]_2Ni(C_4H_9)_2$$

9. In a process for preparing cyclic oligomers by contacting 1,3-butadiene with a catalyst, the novel procedure which comprises employing as a catalyst in said process a complexed divalent organo-nickel compound of the formula:

$$[(C_6H_5CH_2)(C_6H_5)_2P]_2Ni(C_4H_9)_2$$

10. In a process for preparing cyclic oligomers by contacting 1,3-butadiene with a catalyst, the novel procedure which comprises employing as a catalyst in said process a complexed divalent organo-nickel compound of the formula:

$$[(C_6H_5CH_2)_2(C_6H_5)P]_2Ni(C_4H_9)_2$$

11. In a process for preparing cyclic oligomers by contacting 1,3-butadiene with a catalyst, the novel procedure which comprises employing as a catalyst in said process a complexed divalent organo-nickel compound of the formula:

$$[(C_6H_5)_3P]_2Ni(C{\equiv}CC_6H_5)_2$$

References Cited by the Examiner

UNITED STATES PATENTS 3,148,224   9/1964   Luttinger _____ 260—666

OTHER REFERENCES

J. Chatt et al., J. Chem. Soc., pp. 1718–1729, 1960.

DELBERT E. GANTZ, *Primary Examiner.*

V. O'KEEFE, *Assistant Examiner.*